(12) United States Patent
Ripley

(10) Patent No.: US 7,111,175 B2
(45) Date of Patent: Sep. 19, 2006

(54) METHOD AND APPARATUS FOR VERIFYING THE INTEGRITY OF A MEDIA KEY BLOCK

(75) Inventor: Michael S. Ripley, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 944 days.

(21) Appl. No.: 09/750,642

(22) Filed: Dec. 28, 2000

(65) Prior Publication Data

US 2002/0087871 A1 Jul. 4, 2002

(51) Int. Cl.
G06F 12/14 (2006.01)
(52) U.S. Cl. .................. 713/193; 713/189; 380/201
(58) Field of Classification Search ............. 713/190, 713/189, 176, 193; 705/51, 57, 58, 59; 380/201, 380/202
See application file for complete search history.

(56) References Cited

U.S. PATENT DOCUMENTS 5,883,958 A * 3/1999 Ishiguro et al. ............ 705/57
6,609,116 B1 * 8/2003 Lotspiech .................. 705/57
6,697,945 B1 * 2/2004 Ishiguro et al. ............ 713/171
2004/0156503 A1 * 8/2004 Bell et al. .................. 380/44

OTHER PUBLICATIONS

Content Protection for Recordable Media Specification - DVD Book - Intel Oct. 18, 2000 Rev. 0.94.
Content Protection System Architecture - A comprehensive framework for content protection -Intel Feb. 17, 2000 Rev. 0.81.

* cited by examiner

Primary Examiner—Matthew Smithers
(74) Attorney, Agent, or Firm—Michael R. Barre

(57) ABSTRACT

The present invention includes a method, system and apparatus for storing, distributing, and protecting content from unauthorized access. The media includes a writeable area, a read only area and the content stored on the writeable area. A first media validation data containing an encrypted preselected value is stored on the read only area.

21 Claims, 4 Drawing Sheets

METHOD AND APPARATUS FOR VERIFYING THE INTEGRITY OF A MEDIA KEY BLOCK

COPYRIGHT NOTICE

Contained herein is material which is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD

This invention relates to static and dynamic information storage and retrieval. More particularly, this invention relates to methods, apparatus and systems for the protection of stored information from unauthorized access.

BACKGROUND

Information or content may be stored on a wide variety of media. As the speed and convenience of accessing and copying stored information have increased, the threat of unauthorized coping of the information has increased correspondingly. Various schemes have been employed to protect the stored information from unauthorized access. For instance, the content stored on the media may be encrypted with a secret key, or keys, known only to devices authorized to access the media. A disadvantage of only one key is the inability to revoke the authorization of a particular device, by changing the key, without revoking the authority of all devices to read the media. Some of the disadvantages of using multiple keys include the potentially large burden of transmitting and storing the keys for each particular device.

An alternative method developed to protect content from unauthorized copying uses a media key block (MKB) to authorize copying of the content, as described by a publication from 4C Entity, LLC, entitled "CONTENT PROTECTION FOR RECORDABLE MEDIA SPECIFICATION," Revision 0.94 (Oct. 18, 2000). Authorized devices process the MKB to calculate, as described in part below, a media key allowing an authorized device to copy the content. The MKB method uses a media unique key to bind encrypted content to the media from which it will be played back.

An MKB is formatted as a sequence of contiguous records. Each record begins with a record type field, followed by a record length field. In order to process the MKB, each authorized device receives a set of "n" device keys. The "n" device keys are referred to as $Kd\_i$ (i=0, 1, ..., n-1). For each device key there is an associated column and row value in the MKB, referred to as column value ($Cd\_i$ for i=0, 1, ..., n-1) and row value ($Rd\_i$ for i=0, 1, ..., n-1), respectively. An authorized device will have at most one device key for each column of the MKB. Though, an authorized device may have more than one device key per row.

The device keys and associated row and column values are kept secret. If a set of device keys is compromised, an updated MKB can be released that causes a device with the compromised set of device keys to calculate a different media key than is computed by the remaining compliant devices. In this way, the compromised device keys are "revoked" by the new MKB.

Using its device keys, a device calculates the media key by processing records of the MKB one-by-one from first to last. After processing of the MKB is completed, the device uses the most recently calculated media key value as the final value for the media key. If a device correctly processes an MKB using device keys that are revoked by that MKB, the resulting final media key will have the special value 0H, where H designates a hexadecimal number. This special value will never be an MKB's correct final media key value, and can therefore always be taken as an indication that the device's keys are revoked. If a device calculates this special media key value, it stops the authentication, playback, or recording session in progress, and will not use that media key value in any subsequent calculations.

A properly formatted MKB will have exactly one Verify Media Key Record (VMKR) as its first record. The VMKR may also be referred to as validation data. The VMKR contains the hexadecimal value DEADBEEF encrypted with the correct, final media key. The presence of the VMKR is mandatory, but the use of the VMKR by a device is not mandatory. A device may attempt to decrypt the VMKR using its current media key value during the processing of subsequent Records, checking each time for the hexadecimal value DEADBEEF. If the device successfully decrypts the VMKR, the device has already calculated the correct final media key value, and may therefore stop processing the MKB.

A properly formatted MKB will have exactly one calculate media key record (CMKR). Devices must ignore any CMKRs encountered after the first one in an MKB. The CMKR includes a column field. The column field indicates the associated column value for the device key to be used with this record, as described below. The CMKR also contains encrypted key data in each column corresponding to each of the device key rows. Before processing the CMKR, the device checks that the device has a device key with associated column value $Cd\_i$=column, for some i.

If the device does not have a device key with the associated column value, the device ignores the rest of the CMKR. Otherwise, using the value i from the condition above, the device key and $r=Rd\_i$, $c=Cd\_i$, the device decrypts a media key value from the encrypted key data for row $r=Rd\_i$. The resulting media key value becomes the current media key value.

A properly formatted MKB may have zero or more conditionally calculate media key records (C-CMKR). The C-CMKR contains encrypted conditional data. In the columns, the C-CMKR contains doubly encrypted key data. If decrypted successfully, as described below, the encrypted conditional data contains the hexadecimal value DEAD-BEEF and the associated column value for the device key to be used with this C-CMKR. Using its current media key value, the device decrypts conditional data from the encrypted conditional data.

Before continuing to process the Record, the device checks that the following conditions are true: the decrypted conditional data contains the hexadecimal value DEAD-BEEF and the device has a device key with a newly associated column value (i) decrypted from the conditional data. If any of these conditions is false, the device ignores the rest of the C-CMKR. Otherwise, using the value i from the condition above, the current media key value, and $r=Rd\_i$, $c=Cd\_i$, the device decrypts the doubly encrypted key data at the associated column in the C-CMKR. The device then decrypts the result of the first decryption of the doubly encrypted data using the device's i-th device key. The resulting media key becomes the current media key value.

As keys are compromised and revoked, the MKB can become quite large, with a size of several megabytes not being unusual. Since many types of media have limited read-only space, it becomes necessary to store the MKB on writeable areas of the media. Storing the MKB on the writeable area creates a vulnerability of the MKB to direct malicious tampering. In such a direct attack, the intent of the tamperer will likely be to substitute an older MKB for the current MKB stored on the media. In the alternative, the tamperer may substitute a portion of an older MKB for a portion of the current MKB stored on the media. Since the older MKB will still contain keys that are revoked by the current MKB, the substitution will potentially compromise the content protection provided by the current MKB.

Even if the MKB is stored on the readable area of the media, another weakness of the MKB approach is the ability for a man-in-the-middle attack to substitute an older MKB for the current MKB during the attempted processing of the current MKB. In the alternative, the man-in-the-middle attacker may substitute a portion of an older MKB for a portion of the current MKB during the attempted processing of the current MKB. Thus, a man-in-the-middle attack also potentially compromises the content protection provided by the current MKB.

Thus, media without a valid MKB could be read and readers without authorization could read content stored on protected media. In a variation on the MKB approach, a hash value is calculated over the MKB and stored on the read only area of the media. The reader reads the MKB, calculates a hash value of the MKB as read from the media and compares that hash value to the hash value as read from the read only area. Calculating the hash value however imposes an undesirable delay upon the authorization process. Therefore, it is desirable to improve upon the prior art.

DETAILED DESCRIPTION OF THE INVENTION

The present invention includes a method, apparatus and system for verifying the integrity of a media key block or other mechanism used to authorize access to content stored on recordable media.

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

Herein, certain terminology is used to discuss features of the present invention. For example, content is information programmed by owners or licensees, such as broadcast or cable networks. "Content" can by any form of audible or visual information including business data, news, sports, artistic performances, entertainment, advertising, documentaries, talk, films, videos, cartoons, text, music and graphics.

Media includes any mechanism that provides (i.e., stores and/or transmits) content in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc. Typically, content may be stored in encrypted form on media such as DVDs, CDs, floppy discs, flash memory arrays. Access control comes from the inability of an unauthorized device, or a device having revoked keys, to successfully process the MKB, validate the MKB and then decrypt the content.

A media reader is an electronic device that reads the content from the media. A media reader may also read data other than the content from the media. For instance, media reader may be a DVD drive or player, a CD drive or player, a floppy drive, a digital television, a digital VCR, a CPU of a personal computer, a processor or a circuit coupled to flash memory cells, or any other consumer electronics device capable of accessing content stored on the media. Devices which also write or record to the media, such as CD-RW drives, are also considered media readers.

Figure 1:
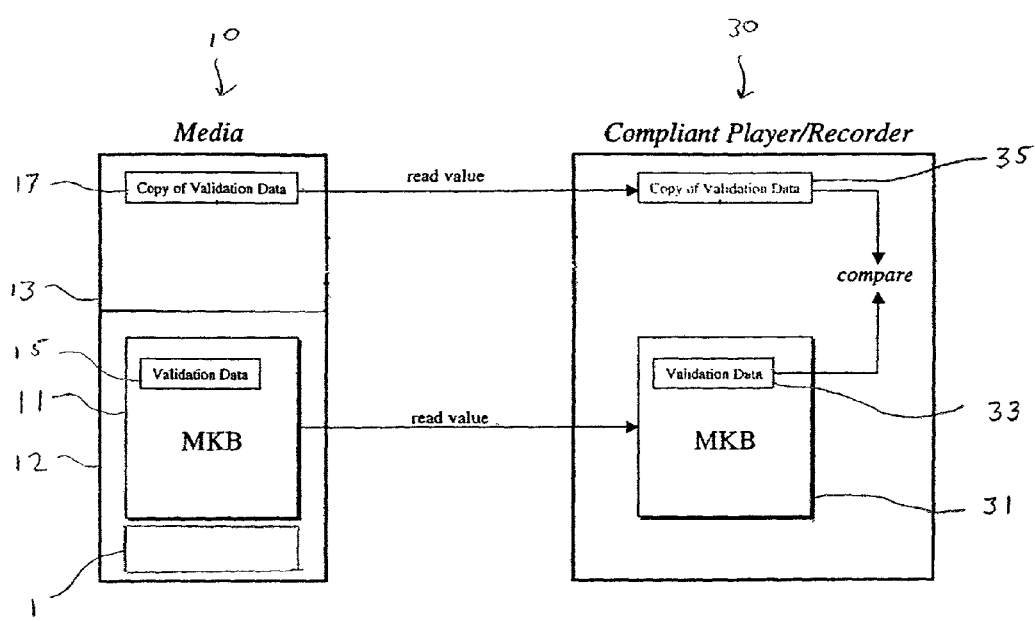
FIG. 1 is a simplified block diagram of an embodiment of the present invention.

Referring now to FIG. 1, an exemplary embodiment of a media (10) loaded into a media reader (30) is shown. The media reader (30) reads content (1) from the media (10). If the media (10) includes a writeable area (12), the media reader (30) may also write data to the writeable area (12) of media (10). The media reader (30) may be any device capable of reading information stored on a media. The media reader (30) includes microprocessors or other circuits to perform the decryptions, calculations and other processing discussed herein. The media (10) may be any media for storing information.

Media (10) includes a read only area (13) and a media key block (MKB) (11) stored on the media (10). Parts of the MKB (11) may be encrypted and includes a Verify Media Key Record (15) which may also be referred to as "validation data". The validation data (15) is encrypted and contains a pre-selected value. It should be noted that some media readers (30) decrypt the validation data (15) during the processing of the MKB (11). In such cases, the present invention does not require an additional read operation over the prior art to retrieve the validation data (15).

A copy of the validation data (17) is stored on the read only area (13) of the media (10). The copy of the validation data (17) is encrypted in the same manner as the validation data (15) is encrypted. Thus, when the copy of the validation data (17) and the validation data (15) are decrypted the same value should be obtained if no malicious tampering has occurred.

Referring still to FIG. 1, the media reader (30) reads information from the media (10). The information that the media reader (30) reads from the media (10) includes the content (1) (after access is authorized), the MKB (31) the media validation data (33) and a copy of the media validation data (35). The media reader (30) decrypts the reader validation data (33), the reader copy of the validation data (35) or both using the media key obtained previously by processing the MKB. If the result of either decryption yields a decrypted value not equal to the preselected value, the media reader (30) refuses to authorize access to the content (1) stored on the media (10). If all of the decrypted values match the preselected value, the media reader (30) continues the authorization process.

It should be noted that the value of a data item as stored on the media (10) and the value of the data item as read by the media reader (30) may differ in an environment in which the content (1) is subject to piracy, direct attacks, man-in-the-middle attacks and other malicious tampering. Therefore, to distinguish between the validation data (15) stored on the media (10) and the validation data (33) read from the media (10) by the media reader (30), the validation data (15) may be referred to as the media validation data (15) and the validation data (33) may be referred to as the reader validation data (33). Similar distinctions can be made between other data items stored on the media (10) and the value of that data item as read by the media reader (30).

The media reader (30) compares the reader validation data (33) and the copy of the reader validation data (35). The comparison may be of either the encrypted values or the decrypted values. Both comparisons may also be made. If the value of the reader validation data (33) and the value of the copy of the reader validation data (35) are equal then the media reader (30) authorizes access to the content (1) stored on the media (10). If these values are not equal, the media reader (30) refuses to authorize access to the content (1) on the media (10).

Thus, by comparing the reader validation data (33) and the copy of the reader validation data (35) in conjunction with authorizing access, man-in-the-middle devices inserted between the media (10) and the media reader (30) may be detected. The method of authorizing access to the content used in conjunction with the comparison of the two copies of the validation data may be chosen from those methods well known to the art, including for example decrypting a media key from an MKB. A man-in-the-middle alteration of either copy of the media validation data (15 or 17) may be detected by the comparison of the encrypted or decrypted values of the copies of the reader validation data (33 and 35). A man-in-the-middle alteration of both copies of the media validation data will be detected by checking for the preselected value in either decrypted copy of the reader validation data, or in both decrypted values.

Figure 2:
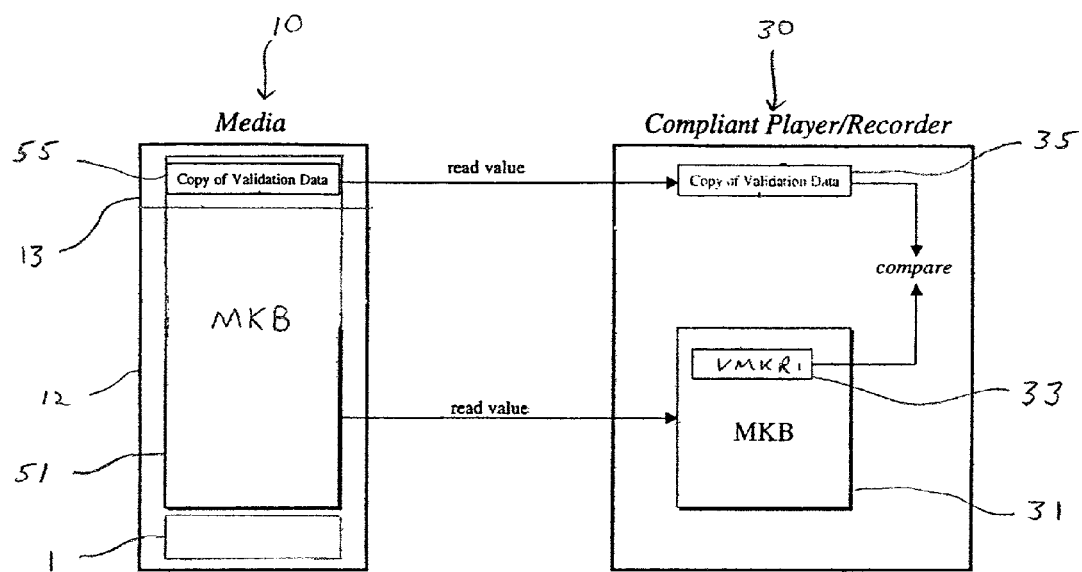
FIG. 2 is a simplified block diagram of another embodiment of the present invention.

Referring now to FIG. 2, another exemplary embodiment of a media (10) and a media reader (30) of the present invention is shown. In this embodiment, the MKB (51) is stored on the media (10) so as to straddle the boundary between the read only area (13) and the writeable area (12), with the media validation data (55) being stored on the read only area (13). No copy of the validation data is required in this embodiment because the read only nature of the read only area (13) of the media (10) protects the validation data from unauthorized tampering.

Figure 3:
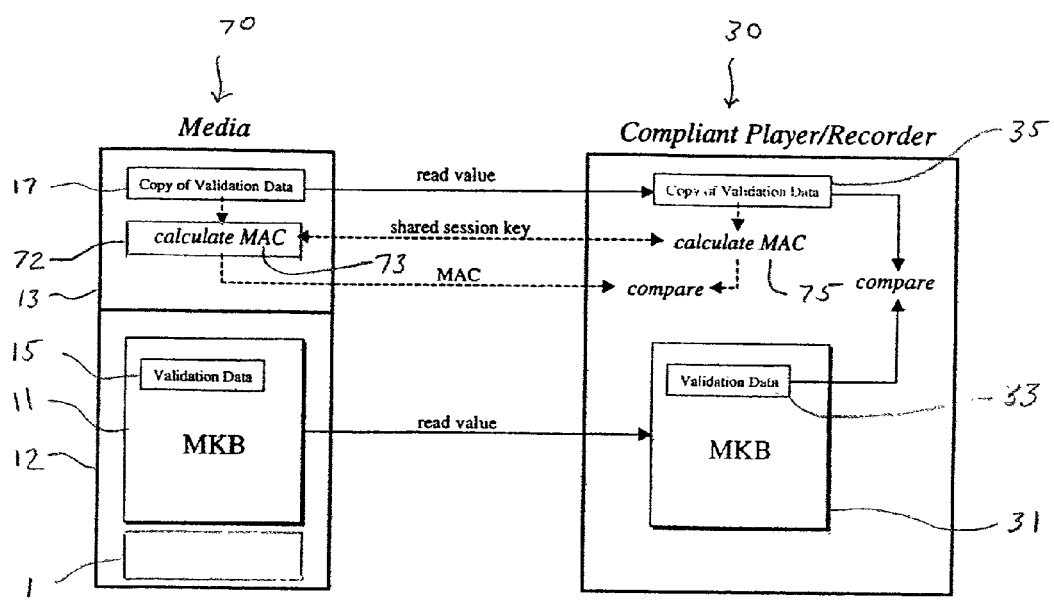
FIG. 3 is a simplified block diagram of another embodiment of the present invention.

Referring now to FIG. 3, yet another exemplary embodiment of a media (70) and a media reader (30) of the present invention is shown. In this embodiment, the media (70) includes both the physical media on which the content is stored and a processor or other logic circuit (72). For instance, the media (70) may be a flash memory array including a processor. Another example of a media with a processor is a DVD drive with a CPU to manage the driver. Though, those skilled in the art will recognize that other combinations of media with a processor are obvious. As with other embodiments, the media may also contain a writeable area (12).

A message authentication code may be employed in addition to the validation data discussed previously. To include a message authentication code (MAC) in the present embodiment, the media (70) calculates a media MAC (73) over the copy of the media validation data (17) using a run-time session key established via authentication and key exchange between the media (70) and a media reader (30). In effect, the media (70) electronically signs the media MKB (11) with the media MAC (73).

The media reader (30) reads the media MAC (73) from the media (70). The media reader (30) also reads the copy of the media validation data (17) and calculates a reader MAC (75) over the copy of the reader validation data (35) using the same algorithm as was used to calculate the MAC (73).

By comparing the reader MAC (75) and the media MAC (73), the media reader (30) makes a second determination of whether authorization for access to the contents of the media (70) should be granted. Should the reader MAC (75) and the media MAC (73) differ, the media reader (30) refuses access to the contents of the media (70). If the two MACs are identical, the media reader (30) allows access to the contents of the media (70). Thus, the media reader (30) checks the electronic signature of the media. The calculation and comparison of the reader and media MACs may occur at any time during the authorization process, including before or after the validation data integrity check is executed.

Thus, a MAC provides another level of protection against man-in-the-middle alterations to the MKB (11). If the man-in-the-middle device alters the copy of the media validation data (17) as the copy of the media validation data (17) is being read from the media (10), the media MAC (73) and the reader MAC (75) will differ. Another embodiment of the present invention includes a personal computer having a processor and an input/output device such as a DVD drive. A media (10) having a content (1) stored on it is loaded into the input/output device. Upon sensing the presence of the media (10), or upon user command, the processor attempts to access the content stored on the media (10). Thus, the processor of the personal computer acts as a media reader (30) and the input/output device acts as a media (10). The processor may be configured to process the media validation data (15) and the copy of the media validation data (17), as set forth herein. As will be obvious to those skilled in the art, the combination of a media (10) and a media reader (30) form a system for protecting and accessing the content (1).

Figure 4:
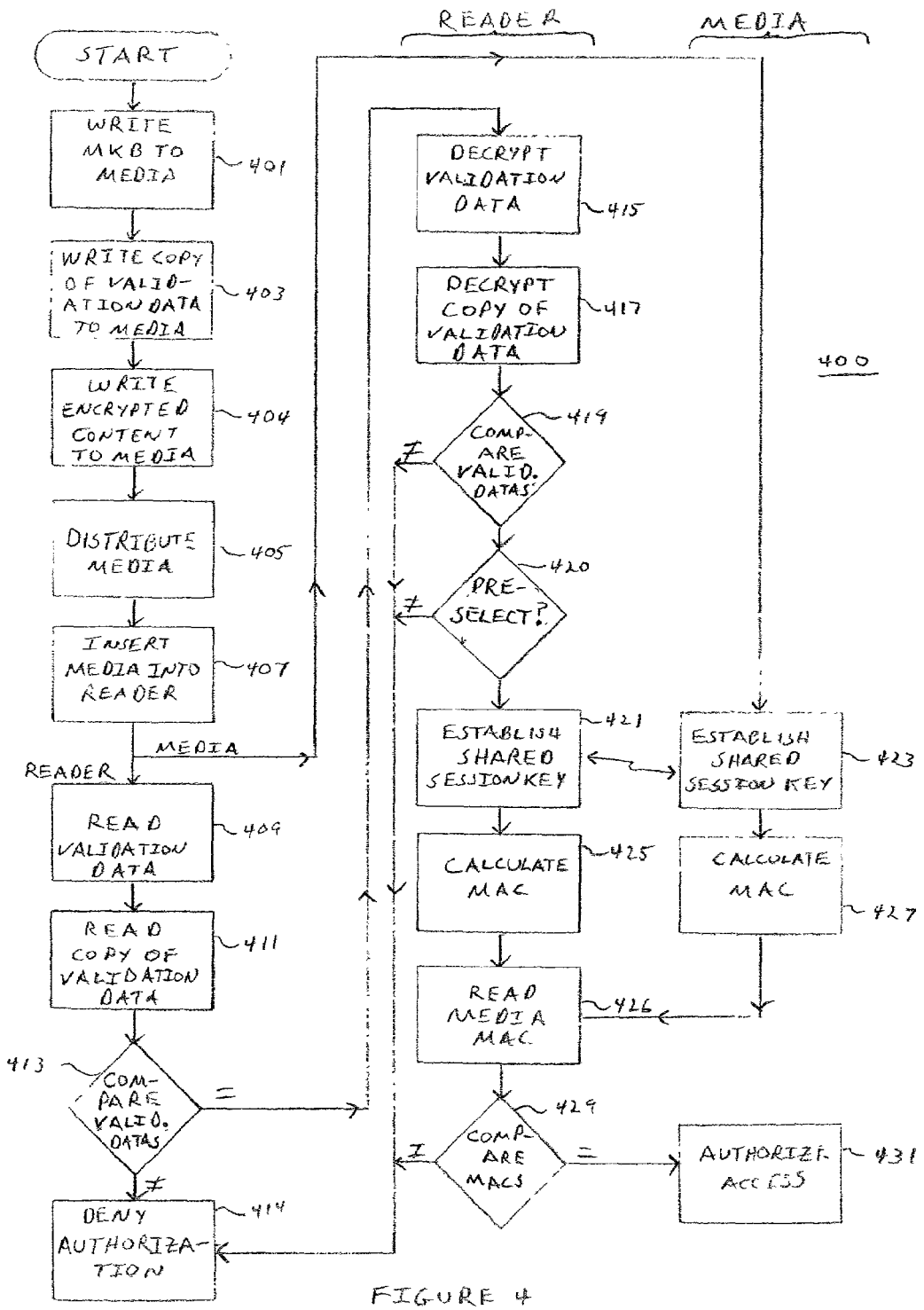
FIG. 4 is a simplified flowchart of a method of the present invention.

Referring now to FIG. 4, an embodiment of a process (400) for authorizing access to content stored on media of the present invention is shown. Before the media is distributed, the MKB including the media validation data is stored on the media (block 401). The media validation data may be stored on the read only area of the media or it may be stored on the writeable area of the media. If the media validation data is stored on the writeable area then a copy of the media validation data is stored on the read only area (block 403). The content is encrypted using the correct media key and then stored on the media before the media is distributed in block 405. In block 407 the user inserts the media into a media reader or connects the media and media reader as dictated by the form of media employed.

Another embodiment includes a media which encrypts and stores content. In other words, the media of this embodiment may be a content recorder such as a CD-RW drive. Thus, the media may execute block 404.

Upon sensing the presence of the media or upon a command or request from the user or other device, the media reader reads the media MKB including the media validation data from the media in block 409 If a copy of the media validation data has been previously stored on the read only area of the media, the media reader also reads the copy of the media validation data from the media in block 411.

The media reader may then compare the encrypted value of the reader validation data read from the media with the encrypted value of the copy of the reader validation data read from the media. If the two values are different the media reader denies authorization to access the content in block 414. Otherwise, the authorization process may continue with block 415.

In blocks 415 and 417, the media reader decrypts the reader validation data read from the media and the copy of the reader validation data read from the media. The media reader may then compare the decrypted values of the reader validation data and of the reader copy of the validation data, as in block 419 using the media key obtained by processing the MKB. If the two values are different the media reader denies authorization to access the content. Otherwise, the authorization process continues with block 420.

In block 420, the media reader compares either the decrypted value of the reader validation data or the decrypted value of the copy of the reader validation data to the pre-selected value. In the alternative, the reader may compare both the decrypted reader validation data and the decrypted copy of the reader validation data to the preselected value. If any one of the comparisons fails, then the media reader denies authorization to access the content.

In blocks 421 and 423, the media and media reader establish a shared session key in any manner known to the art. The media reader, in block 425, calculates a reader MAC over a reader hash value of the reader MKB read from the media. The media, in block 427, likewise calculates a media MAC over a media hash value of the media MKB. In blocks 426 and 429, the driver then reads the media MAC from the media and compares it to the reader MAC. If the two values are different the media reader denies authorization to access the content. Otherwise, the driver may authorize access to the content or may process the MKB, as shown in block 431.

Another exemplary embodiment includes processing the MKB to obtain the correct media key; decrypting the validation data with the media key; verifying that the validation data contains the correct preselected value; and comparing the encrypted value of the validation data in the MKB with the encrypted validation data over which a MAC has been successfully calculated by the device and reader. Another exemplary embodiment includes successfully calculating a MAC over the validation data; decrypting the validation data stored on the read only area of the media; and verifying that the validation data contains the correct preselected value. Yet another embodiment includes calculating and comparing the MACs before reading the two copies of the validation data. Thus, when the reader reads either copy of the validation data the MAC may accompany the validation data.

Instructions to execute the process described above may be stored on a machine readable medium. The machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc. Those skilled in the art will recognize that a media may be used to store instructions to execute the process described above, and a medium may be used to store or transmit content.

Since a man-in-the-middle attack cannot alter the read only copy of the validation data, the present invention will detect such an attack. Furthermore, if the present invention is used in conjunction with an authorization scheme such as an MKB, man-in-the-middle attacks, which attempt to alter the MKB as the MKB is read from the media, will likewise be detected. In addition, since the present invention may involve as few calculations as a decryption of a relatively small validation data, as opposed to calculating a hash value over an entire MKB, the present invention provides much quicker verification of the integrity of the MKB. Moreover, the present invention provides improved content protection over the prior art.

While the present invention has been described in particular embodiments, the present invention should not be construed as limited by such embodiments, but rather construed according to the claims that follow below.

What is claim is:

1. A tangible machine readable medium, comprising:
   a writeable area of the medium;
   a read only area of the medium;
   a content stored on the writeable area of the medium;
   a first media validation data containing an encrypted preselected value and being stored on the writeable area; and,
   a second media validation data equal to the first media validation data and being stored on the read only area, the second media validation data to be used for determining authorization to access the content stored on the medium.

2. The medium of claim 1 is a digital versatile disc (DVD).

3. A device comprising:
   an input/output apparatus to access a medium; and,
   a processor communicatively coupled with the input/output apparatus, the processor being configured to
   read a first media validation data from a writeable area of the medium,
   set a first device validation data equal to the first media validation data,
   read a second media validation data from a read only area of the medium,
   set a second device validation data equal to the second media validation data,
   compare the first device validation data and the second device validation data, and
   deny authorization to access content stored on the medium if the first device validation data and the second device validation data are unequal.

4. The device of claim 3, further comprising:
   a circuit to calculate a message authentication code over the first media validation data using a shared session key to be established between the medium and a device authorized to access the content.

5. The device of claim 3, wherein the processor is further configured to decrypt at least one of the first device validation data and the second device validation data and to deny authorization to access the content if a result of the decryption is unequal to a preselected value.

6. The device of claim 3, wherein the processor is further configured to:
   establish a shared session key with the medium
   read a first media message authentication code from the medium,
   set a first device message authentication code equal to the first media message authentication code,
   calculate a second device message authentication code over the first media validation data using the shared session key,
   compare the first device message authentication code and the second device message authentication code, and deny authorization to access a content stored on the medium if the first device message authentication code and the second device message authentication code are unequal.

7. The device of claim 3 is a digital versatile disc (DVD) player.

8. A data protection system, comprising:
a medium including (i) a writeable area that stores a first media validation data containing an encrypted preselected value and a content, (ii) a read only area of the medium that stores a second media validation data equal to the first media validation data.
a processor communicatively coupled with the medium, the processor being configured to read the first media validation data, set a first device validation data equal to the first media validation data, read the second media validation data, set a second device validation data equal to the second media validation data, compare the first device validation data and the second device validation data, and deny authorization to access the content if the first device validation data and the second device validation data are unequal.

9. The data protection system of claim 8, further comprising:
a media circuit to calculate a media message authentication code over the second media validation data using a shared session key to be established when the processor attempts to access the content.

10. The data protection system of claim 8, wherein the processor is further configured to
establish a shared session key with the medium
read a media message authentication code from the medium,
set a first device message authentication code equal to the media message authentication code,
calculate a second device message authentication code over the first device validation data using the shared session key,
compare the first and the second device message authentication codes and
deny authorization to access the content if the first and the second device message authentication codes are unequal.

11. The data protection system of claim 8, wherein the reader is a digital versatile disc (DVD) player.

12. A method, comprising:
preselecting a value;
encrypting the preselected value;
setting a media validation data equal to the encrypted preselected value;
storing a first copy of the media validation data on a writeable area of a medium; and,
storing a second copy of the media validation data on a read only area of the medium to protect a content stored on the medium.

13. The method of claim 12, further comprising:
configuring a media processor to calculate a media message authentication code over the media validation data using a shared session key to be established when a media reader attempts to access the content.

14. A tangible machine readable medium containing instructions which, when executed by an apparatus causes the apparatus to perform operations, comprising:
setting a validation data equal to an encrypted preselected value;
storing a first copy of the validation data on a writeable area of a medium; and,
storing a second copy of the validation data on a read only area of the medium, the second copy of the validation data to be used for determining authorization to access the content stored on the medium.

15. The method of claim 14, further comprising:
configuring the media reader to decrypt both the first device validation data and the second device validation data; and,
configuring the media reader to deny authorization to access the content if a result of the decryption is unequal to the preselected value.

16. The method of claim 12, wherein the medium is a digital versatile disc (DVD).

17. A tangible machine readable medium containing instructions which, when executed by an apparatus causes the apparatus to perform operations, comprising:
setting a validation data equal to an encrypted preselected value;
storing a first copy of the validation data on a writeable area of a medium; and,
storing a second copy of the validation data on a read only area of the medium.

18. The machine readable medium of claim 17, wherein the instructions, when executed, further cause the apparatus to perform operations comprising:
configuring a media processor to calculate a media message authentication code over the validation data using a shared session key to be established when a media reader attempts to access the content.

19. The machine readable medium of claim 17 is a digital versatile disc (DVD).

20. A tangible machine readable medium, comprising:
a writeable area of the medium;
a read only area of the medium;
a content stored on the writeable area of the medium;
a first media validation data containing an encrypted preselected value and being stored on the read only area; and,
a second media validation data equal to the first media validation data and being stored on the writeable area, the second media validation data to be used for determining authorization to access the content stored on the medium.

21. The medium of claim 20, further comprising:
a circuit to calculate a media message authentication code over the first media validation data using a shared session key to be established between the medium and a device authorized to access the content.

* * * * *